United States Patent Office 3,133,081
Patented May 12, 1964

---

3,133,081
3-AMINOINDAZOLE DERIVATIVES
John J. Lafferty, Levittown, David H. Tedeschi, Pennsauken, and Charles L. Zirkle, Berwyn, Pa., assignors to Smith Kline & French Laboratories, Philadelphia, Pa., a corporation of Pennsylvania
No Drawing. Filed Nov. 30, 1961, Ser. No. 156,154
7 Claims. (Cl. 260—310)

This invention relates to new 3-aminoindazole derivatives having valuable therapeutic activity. More specifically the 3-aminoindazoles of this invention have central nervous system activity and are particularly useful as muscle relaxants, analgesics, antipyretics and mild tranquilizers.

The novel 3-aminoindazole derivatives of this invention are represented by the following structural formula:

Formula I

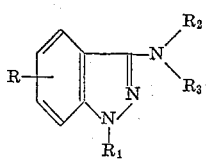

when:

R represents halogen having an atomic weight of less than 80 or trifluoromethyl, said R being in a position $\beta$ to the hetero ring;
$R_1$ represents hydrogen, lower alkyl or phenyl and
$R_2$ and $R_3$ represent hydrogen or lower alkyl.

The term "lower alkyl" where used herein denotes groups having 1–6 carbon atoms preferably 1–2.

The preferred compounds of this invention are those of Formula I in which R is in the 5-position.

Advantageous compounds of this invention have the following formula:

Formula II

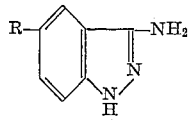

in which R is trifluoromethyl or chloro.

A compound of this invention having particularly advantageous therapeutic activity is 3-amino-5-trifluoromethylindazole.

This invention also includes pharmaceutically acceptable salts of the above defined bases formed with non-toxic organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methanesulfonic, ethanedisulfonic, acetic, propionic, tartaric, salicylic, citric, gluconic, lactic malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example, 8-bromotheoplylline. Exemplary of such inorganic salts are those with hydrochloric, hydrobromic, sulfuric, sulfamic, phosphoric and nitric acids. If course, these salts may also be prepared by the classical method of double decomposition of appropriate salts which is well-known to the art.

The novel 3-aminoindazole derivatives of this invention are prepared by either of the following procedures:

PROCEDURE A

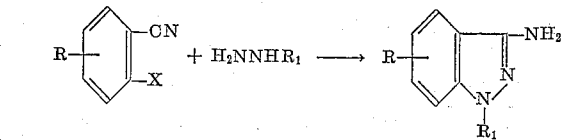

X is Br, I or Cl and R and $R_1$ are as defined hereabove.

PROCEDURE B

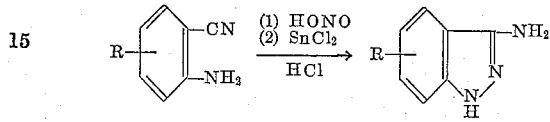

The term R is as defined hereabove.

According to Procedure A above an R-substituted-o-halobenzonitrile is reacted with at least one equivalent of a hydrazine in a suitable solvent such as a lower alkanol for example ethanol, isopropanol or butanol. The reaction is advantageously carried out at elevated temperature such as from about 45° C. to the reflux temperature for from about 12 to 36 hours. It is preferable to have a small amount of a mineral acid such as hydrochloric acid present in the reaction mixture to catalyze the cyclization to the indazole.

By Procedure B above an R-substituted-o-cyanoaniline is diazotized by treating with concentrated hydrochloric acid and sodium nitrite and the resulting diazo compound is treated with stannous chloride in concentrated hydrochloric acid at about 0° C. to give, after working up, the 3-aminoindazole of this invention.

The compounds of this invention in which the 3-amino group is alkylated, i.e., the compounds of Formula I in which one or both of $R_2$ and $R_3$ are lower alkyl, may be prepared by the following procedures.

Monomethylation is carried out by reacting the primary amine with methyl or ethyl formate and refluxing the resulting N-formyl compounds with a metallic hydride such as lithium aluminum hydride or sodium hydride, preferably in an ethereal solvent. The dimethylamino derivatives are obtained by treating the primary amine with a mixture of aqueous formaldehyde and formic acid.

The 3-alkylamino compounds of this invention may also be prepared as follows:

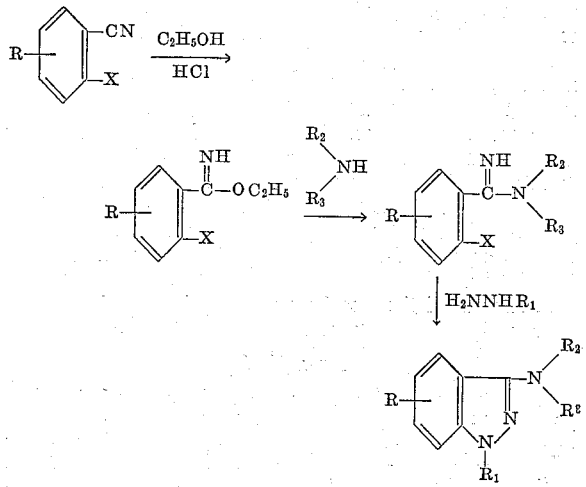

The terms R, $R_1$, $R_2$, $R_3$ and X are as defined hereabove.
An equimolar mixture of an o-halobenzonitrile and a lower alkanol are treated with dry hydrogen chloride to give the imino-ether which is reacted with an amine having the formula, $R_2R_3NH$, to give the amidine. Condensing the o-halobenzamidine with a hydrazine gives the 3-alkylaminoindazoles of this invention.

Certain of the compounds of this invention exist in polymorphic forms all of which are objects of this invention.

The course of the reactions described hereabove for the preparation of the compounds of Formula I in which $R_1$ is lower alkyl or phenyl is uncertain. Therefore, although the structures have been written throughout the specification and claims with $R_1$ in the 1-position, the compounds in which $R_1$ is in the 2-position may be formed in certain instances and it is intended that they are also objects of this invention.

The 3-aminoindazole derivatives of this invention are preferably employed in pharmaceutical form in admixture with a pharmaceutical carrier. The pharmaceutical carrier may be either a solid or a liquid. Exemplary of solid carriers are lactose, magnesium stearate, terra alba, sucrose, talc, stearic acid, gelatin, agar, pectin and acacia. Exemplary of liquid carriers are peanut oil, olive oil, sesame oil and water. Similarly, the carrier or diluent may include a time delay material such as glyceryl monostearate or glyceryl distearate alone or with a wax.

A wide variety of pharmaceutical forms can be used. Thus if a solid carrier is used, the preparation can be in the form of a tablet, a pharmaceutical powder, a hard gelatin capsule, a troche or a lozenge. If a liquid carrier is used, the preparation can be in the form of a soft gelatin capsule or may be placed in an ampule or in a liquid suspension.

A dosage unit for internal administration comprises from about 25 mg. to about 350 mg., preferably from about 50 to about 200 mg. of active ingredient.

The administration may be parenterally or orally. Advantageously equal doses will be administered from one to four times daily. The daily dosage regimen will be from about 50 to about 350 mg., preferably from about 100 to about 250 mg. per day.

The following examples are not limiting but are illustrative of this invention.

*Example 1*

To a cuprous cyanide solution prepared from 125 g. of cupric sulfate is added in 200 ml. of toluene the diazonium salt prepared from 48 g. of 2-bromo-5-trifluoromethylaniline. The cyanide solution is kept alkaline by addition of solid sodium carbonate during the addition of the diazonium salt at 0–5° C. The mixture is stirred for three hours, then allowed to stand for 16 hours. The toluene layer is subjected to steam distillation. The toluene is distilled off, followed by 2-bromo-5-trifluoromethylbenzonitrile, which is recrystallized from hexane to give colorless crystals, M.P. 50–51° C.

A solution of 8.0 g. of 2-bromo-5-trifluoromethylbenzonitrile, 3 ml. of 95% hydrazine and 40 ml. of ethanol is kept at 45–50° C. for 30 hours. The solution is evaporated to dryness. The residue is treated with 100 ml. of 2 N hydrochloric acid, then stirred and heated to 95° C. On cooling the aqueous layer is decanted off and treated with sodium acetate to near neutrality. The precipitate is isolated by filtration and recrystallized from benzene to yield 3-amino-5-trifluoromethylindazole, M.P. 122–123° C.

A sample of the free base in ether is treated with hydrogen chloride gas to give the hydrochloride salt.

*Example 2*

A mixture of 20.6 g. of 2-nitro-4-trifluoromethylaniline, 30 ml. of hydrochloric acid and 40 ml. of water is poured onto 80 g. of crushed ice and treated with 6.0 g. of sodium nitrite at 0–5° C. The resulting diazonium salt solution is added slowly to an aqueous solution of cuprous cyanide (prepared by treating 35 g. of copper sulfate with potassium cyanide). The mixture is warmed at 50–60° C. for 30 minutes, then cooled and treated with concentrated hydrochloric acid. The precipitate is collected by filtration and extracted with boiling carbon tetrachloride. Cooling and filtering the extracts gives 2-nitro-4-trifluoromethylbenzonitrile.

Water (50 ml.) is added to a solution of 11.4 g. of the above prepared nitro compound in 50 ml. of glacial acetic acid. Eight grams of iron powder is added slowly at 60° C. Cooling, basifying with sodium carbonate, filtering the precipitate, extracting it with boiling ether and evaporating the extracts gives 2-cyano-5-trifluoromethylaniline.

To a mixture of 18.6 g. of 2-cyano-5-trifluoromethylaniline and 120 ml. of concentrated hydrochloric acid is added dropwise 8.0 g. of sodium nitrite in aqueous solution. The resulting diazo solution is added dropwise to 152 g. of stannous chloride in concentrated hydrochloric acid at 0° C. After allowing the mixture to stand for several hours at 0° C., it is filtered. The solid is treated with boiling water and the solution is made alkaline. The precipitate is recrystallized from benzene to give 3-amino-6-trifluoromethylindazole, M.P. 168–169° C.

*Example 3*

By the procedure of Example 2, 15.2 g. of 4-chloro-2-cyanoaniline is diazotized and treated with stannous chloride to give 3-amino-5-chloroindazole, M.P. 162–163° C.

The free base is converted to the hydrochloride salt by treatment with hydrogen chloride in ether-ethanol solution.

*Example 4*

4-chloro-2-iodoaniline is treated with sodium nitrite and hydrochloric acid to give the diazonium salt which is reacted with cuprous cyanide as in Example 2 to yield 4-chloro-2-iodobenzonitrile.

A mixture of 10.0 g. of 4-chloro-2-iodobenzonitrile, 5 ml. of 95% hydrazine and 50 ml. of ethanol is allowed to stand for 24 hours at 50° C. Working up as in Example 1 gives 3-amino-6-chloroindazole.

The base in ethanol solution is treated with an equivalent amount of hydrogen chloride to give, on concentration and cooling, the hydrochloride salt.

*Example 5*

5-bromo-2-nitroaniline is converted into 5-bromo-2-nitrobenzonitrile by treating the aniline derivative with sodium nitrite and hydrochloric acid and reacting the resulting diazonium salt with cuprous cyanide as in Example 2. The nitro group is reduced with stannous chloride and hydrochloric acid to give 4-bromo-2-cyanoaniline.

Twenty grams of 4-bromo-2-cyanoaniline is treated with concentrated hydrochloric acid and sodium nitrite; the resulting diazo compound is reacted with stannous chloride in concentrated hydrochloric acid at 0° C. Working up as in Example 2 gives 3-amino-5-bromoindazole.

A 1.0 g. sample of the free base in 50 ml. of ethyl acetate is treated with an excess of maleic acid in ethyl acetate solution. Concentrating and cooling gives 3-amino-5-bromoindazole maleate.

*Example 6*

A mixture of 22 g. of 4-fluoroaniline, 50 g. of iodine, 25 g. of calcium carbonate, 75 ml. of ether and 75 ml. of water is heated at reflux for 48 hours. The ether is removed by distillation and the excess iodine is destroyed by addition of sodium thiosulfate. Steam distillation and recrystallization from petroleum ether gives 4-fluoro-2-iodoaniline.

Fifteen grams of cuprous cyanide and 14 g. of dry pyridine are heated to a homogeneous melt. After adding 25.0 g. of 4-fluoro-2-iodoaniline, the mixture is heated at about 160–170° C. for two hours. To the cooled mixture, concentrated sodium cyanide solution is added. The solid material is filtered off and extracted with benzene. The benzene extracts are concentrated and fractionally distilled to give 2-cyano-4-fluoroaniline.

By the procedure of Example 2, 13.6 g. of 2-cyano-4-fluoroaniline is treated with 8.0 g. of sodium nitrite and concentrated hydrochloric acid, followed by stannous chloride to give 3-amino-5-fluoroindazole.

Example 7

A solution of 10.05 g. of 3-amino-5-trifluoromethylindazole in 120 ml. of dry nitrobenzene is treated with 4.75 ml. of dimethyl sulfate by dropwise addition over five minutes. The resulting mixture is stirred at 150° C. for one hour, then cooled to room temperature and taken up in excess dilute hydrochloric acid. The acid solution is neutralized with 40% sodium hydroxide and solid sodium bicarbonate. A solid forms which is filtered, washed with hot benzene and recrystallized from ethanol and ethanol-heptane to give 1(or 2)-methyl-3-amino-5-trifluoromethylindazole, M.P. 225–226° C.

An ethyl acetate solution of the free base is treated with an equivalent amount of citric acid to give, upon concentration and cooling, the citrate salt.

A mixture of 10.0 g. of 2-chloro-5-trifluoromethylbenzonitrile and 5.0 ml. of monomethylhydrazine in 50 ml. of butanol is heated at reflux for 18 hours. The mixture is evaporated to dryness. The residue is slurried with ether and filtered. The yellow crystalline solid is 1(or 2)-methyl-3-amino-5-trifluoromethylindazole, M.P. 145° C.

Example 8

A mixture of 10.0 g. of 2-bromo-5-trifluoromethylbenzonitrile and 5.0 g. of monophenylhydrazine in butanol is refluxed for 12 hours. Evaporating the mixture to dryness, treating the residue with ether, and filtering gives 1(or 2)-phenyl-3-amino-5-trifluoromethylindazole.

Example 9

A mixture of 5.0 g. of 3-amino-5-trifluoromethylindazole, prepared as in Example 1, and 25 ml. of methyl formate is refluxed for eight hours, then concentrated in vacuo to leave crude 3-formylamino-5-trifluoromethylindazole.

An ether solution of 3-formylamino-5-trifluoromethylindazole is added to 2.0 g. of lithium aluminum hydride in ether. The resulting mixture is refluxed for 16 hours. Ether is added, followed by water. The mixture is filtered and the filtrate is concentrated. The residue is recrystallized from benzene to give 3-methylamino-5-trifluoromethylindazole.

Example 10

A mixture of 4.0 g. of 3-amino-5-chloroindazole, prepared as in Example 3, 7 ml. of 40% aqueous formaldehyde and 10 ml. of 90% formic acid is heated at reflux for 16 hours. The cooled reaction mixture is treated with 4 ml. of concentrated hydrochloric acid and the solution is evaporated in vacuo. The residue is neutralized with sodium hydroxide and extrated with ether. The extracts are evaporated to give 3-dimethylamino-5-chloroindazole.

The free base in ethanol is treated with an excess of ethereal hydrogen chloride to give the hydrochloride salt.

Example 11

Into a mixture of 20.5 g. of 2-bromo-5-trifluoromethylbenzonitrile and 4.6 g. of ethanol in ether is passed dry hydrogen chloride at room temperature. The mixture is allowed to stand overnight. Neutralizing, separating the organic layer and concentrating in vacuo gives 2-bromo-5-trifluoromethylbenzimino ethyl ether.

The imino-ether is treated with an equimolar amount of diethylether at room temperature in ethanol solution. After concentrating in vacuo N,N-diethyl-2-bromo-5-trifluoromethylbenzamidine is obtained.

A mixture of 5.0 g. of N,N-diethyl-2-bromo-5-trifluoromethylbenzamidine and 2.0 ml. of 95% hydrazine are refluxed in butanol for 12 hours. Evaporating the solution, treating the residue with ether and filtering gives 3-diethylamino-5-trifluoromethylindazole.

Example 12

Ingredients:                                            Amounts, mg.
- 3-amino-5-trifluoromethylindazole _____ 100
- Sucrose _____ 50
- Starch _____ 30
- Talc _____ 6
- Stearic acid _____ 3

The active ingredient and the sucrose are mixed and granulated with 10% gelatin solution. The wetted mass is passed through a #6 U.S. mesh screen onto drying trays. The granules are dried and passed through a #20 U.S. mesh screen. These granules are then mixed with the starch, talc and stearic acid, passed through a #60 U.S. mesh screen and then compressed into tablets.

One tablet is administered twice a day.

Example 13

Ingredients:                                            Amounts, mg.
- 3-amino-5-trifluoromethylindazole hydrochloride _____ 75
- Lactose _____ 100

The ingredients are screened through a #40 U.S. mesh screen, transferred to a mixer, mixed well and filled into a hard gelatin capsule.

One capsule is administered three times a day.

Example 14

Ingredients:                                            Amounts, mg.
- 3-amino-5-chloroindazole _____ 125
- Peanut oil _____ 100

The ingredients are mixed into a thick slurry and filled into a soft gelatin capsule.

Example 15

Ingredients:                                            Amounts, mg.
- 3-amino-5-chloroindazole hydrochloride _____ 100
- Lactose _____ 100

The above ingredients are mixed and filled into a hard gelatin capsule.

What is claimed is:

1. A chemical compound of the class consisting of a free base and its nontoxic, pharmaceutically acceptable acid addition salts, the free base having the formula:

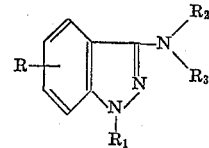

in which:
- R is a member selected from the group consisting of halogen having an atomic weight of less than 80 and trifluoromethyl, said member being in a position β to the hetero ring;
- $R_1$ is a member selected from the group consisting of hydrogen, lower alkyl and phenyl; and
- $R_2$ and $R_3$ are members selected from the group consisting of hydrogen and lower alkyl.

2. A chemical compound of the formula:

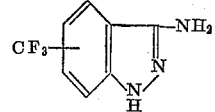

in which the $CF_3$ moiety is in a position β to the hetero ring.

3. 3-amino-5-trifluoromethylindazole.
4. 3-amino-6-trifluoromethylindazole.
5. A chemical compound of the formula:

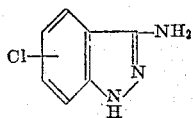

in which the Cl moiety is in a position β to the hetero ring.

6. 3-amino-5-chloroindazole.
7. 3-amino-6-chloroindazole.

References Cited in the file of this patent

UNITED STATES PATENTS

| | | |
|---|---|---|
| 2,969,372 | Braun et al. | Jan. 24, 1961 |
| 2,969,373 | Loev et al. | Jan. 24, 1961 |
| 3,007,938 | Kirchner | Nov. 7, 1961 |

OTHER REFERENCES

Auwers et al.: Ber., vol. 55, pages 1145, 1152 (1922).
Ainsworth: J. Amer. Chem. Soc., vol. 79, pages 5245–47 (1957).
Burnett et al.: J. Org. Chem., vol. 23, pages 1382–3 (1958).
Aron et al.: Chem. and Ind., 1958, pages 1234–35.
Cooper: J. Chem. Soc. (London), 1958, pages 4212–13.
Yale: J. Med. Pharm. Chem., vol. 1, pages 121–33 (1959).
Chao Erh-Chang et al.: Zhurnal Obshchei Khimii (USSR), vol. 29, pages 1012–1020 (1959).
Barben et al.: J. Chem. Soc. (London), 1960, pages 672–76.
Barben et al.: J. Chem. Soc. (London), 1960, pages 2735–9.